United States Patent
Saito et al.

(10) Patent No.: US 8,623,304 B2
(45) Date of Patent: Jan. 7, 2014

(54) METHOD AND DEVICE FOR TREATING CHLORINE BYPASS DUST AND DISCHARGE GAS

(75) Inventors: Shinichiro Saito, Chiba (JP); Junichi Terasaki, Chiba (JP)

(73) Assignee: Taiheiyo Cement Corporation, Tokyo (JP)

( * ) Notice: Subject to any disclaimer, the term of this patent is extended or adjusted under 35 U.S.C. 154(b) by 0 days.

(21) Appl. No.: 13/811,197

(22) PCT Filed: Aug. 4, 2011

(86) PCT No.: PCT/JP2011/067861
§ 371 (c)(1),
(2), (4) Date: Mar. 8, 2013

(87) PCT Pub. No.: WO2012/020691
PCT Pub. Date: Feb. 16, 2012

(65) Prior Publication Data
US 2013/0202514 A1    Aug. 8, 2013

(30) Foreign Application Priority Data

Aug. 10, 2010  (JP) ................................ 2010-179104
Oct. 25, 2010  (JP) ................................ 2010-238089

(51) Int. Cl.
*B01D 45/12*  (2006.01)
*B01D 53/34*  (2006.01)
*B01D 53/74*  (2006.01)

(52) U.S. Cl.
USPC .................. 423/210; 423/215.5; 423/243.01; 423/243.08; 422/168; 422/187; 106/761; 106/762

(58) Field of Classification Search
USPC .................... 423/210, 215.5, 243.01, 243.08; 422/168, 187; 106/761, 762
See application file for complete search history.

(56) References Cited

U.S. PATENT DOCUMENTS

| | | | | |
|---|---|---|---|---|
| 4,065,320 A | * | 12/1977 | Heian et al. | 106/740 |
| 7,947,242 B2 | * | 5/2011 | Saito et al. | 423/242.1 |
| 2007/0086930 A1 | * | 4/2007 | Saito | 422/168 |
| 2013/0192497 A1 | * | 8/2013 | Terasaki et al. | 106/819 |

FOREIGN PATENT DOCUMENTS

| | | | | |
|---|---|---|---|---|
| JP | 2003236503 A | | 8/2003 | |
| JP | 2006347831 A | | 12/2006 | |
| JP | 2007119830 A | | 5/2007 | |
| JP | 2010-001176 A | * | 1/2010 | ............... C07B 7/60 |
| JP | 2010001176 A | | 7/2010 | |

OTHER PUBLICATIONS

International Search Report for PCT/JP2011/067861. Issued on Nov. 8, 2011.

* cited by examiner

*Primary Examiner* — Timothy Vanoy
(74) *Attorney, Agent, or Firm* — Stetina Brunda Garred & Brucker

(57) ABSTRACT

In accordance with the present invention, there is provide and device and method to facilitate the treatment of chlorine bypass dust while preventing increases in chemical cost and concentrations of heavy metals in clinker, and ensuring stability in quality of cement, and to treat chlorine bypass exhaust gas while avoiding coating troubles in a cement kiln etc., and preventing heat losses in a preheater etc., without degradation of clinker production amount.

15 Claims, 8 Drawing Sheets

(a)

(b)

METHOD AND DEVICE FOR TREATING CHLORINE BYPASS DUST AND DISCHARGE GAS

CROSS-REFERENCE TO RELATED APPLICATIONS

The present application claims priority to International Application No. PCT/JP2011/067861 filed Aug. 4, 2011, which claims priority to Japanese Patent Application Nos. 2010-179104 filed Aug. 10, 2010 and 2010-238089 filed Oct. 25, 2010.

STATEMENT RE: FEDERALLY SPONSORED RESEARCH/DEVELOPMENT

Not Applicable

BACKGROUND OF THE INVENTION

1. Technical Field of the Invention

The present invention relates to a method and an apparatus for treating chlorine bypass dust that is recovered from a chlorine bypass system attached to a cement manufacturing facility and gas exhausted from the chlorine bypass facility.

2. Description of the Related Art

Chlorine bypass systems have been used to remove chlorine that may cause troubles such as preheater clogging in cement manufacturing facilities. In recent years, recycling of waste through conversion to cement raw material or fuel has been promoted, which increases the quantity of volatile matters such as chlorine, and the quantity of chlorine bypass dust generated as the quantity of the treated waste increases, which necessitates developments of methods for effectively utilizing the chlorine bypass dust.

From the above-mentioned point of view, in a treatment method through conversion to cement raw material described in Patent Documents 1 and 2, to wastes containing chlorine is added water to allow the chlorine in the wastes to be eluted and filtrated; desalted cake obtained is utilized as a cement raw material; pH of waste water is adjusted to precipitate heavy metals and collect them; and the waste water from which heavy metals are collected is discharged after salt is recovered therefrom or as it is.

In addition, in a method and an apparatus for treating chlorine bypass dust described in Patent Document 3, a slurry obtained by adding water to a chlorine bypass dust is stored, and the stored slurry is fed to a cement finishing process together with at least one selected from the group consisting of a clinker, a gypsum and an admixture, and those are crushed while being mixed in a mill for cement production.

Meanwhile, in a gas exhausted from the above chlorine bypass facility (hereinafter referred to as "chlorine bypass exhaust gas") is contained high concentration $SO_2$, which necessitates desulfurization treatment. Then, for example, in the Patent Documents 4 and 5, after the chlorine bypass dust is recovered, the chlorine bypass exhaust gas is returned to a cement kiln system for treatment.

Patent document 1: Japan Patent No. 3304300 gazette
Patent document 2: Japan Patent No. 4210456 gazette
Patent document 3: Japan Patent No. 4434361 gazette
Patent document 4: Japanese Patent publication No. 2010-180063 gazette
Patent document 5: Japanese Patent publication No. 2010-195660 gazette

SUMMARY OF THE INVENTION

However, in the above-mentioned inventions described in the Patent Documents 1 and 2, heavy metals remain in a desalted cake, and a sludge recovered in waste water treatment contains heavy metals also, therefore, when the desalted cake and the sludge are returned to a cement raw material system, heavy metals are concentrated in a cement burning system while circulating therein, which may cause problems such as increased chemical cost for waste water treatment and increased concentrations of heavy metals in clinker.

In addition, in the treatment method described in Patent Document 3, water is added to the chlorine bypass dust to generate slurry, which causes CaO in the chlorine bypass dust to be converted to $Ca(OH)_2$ through slaking. Therefore, CaO, $Ca(OH)_2$ and $CaCO_3$ that are unreacted and remain as calcium compounds exist in a mixed state in the slurry, and when this slurry is fed to a cement finishing process, CaO and $Ca(OH)_2$ contents in produced cement fluctuate, which may affect properties such as setting time of the cement.

On the other hand, when the above chlorine bypass exhaust gas is returned to the cement kiln system to perform desulfurization, sulfur content is concentrated in the cement kiln system, which causes coating troubles in the cement kiln or a preheater to be increased, and heat losses in the preheater and the like are increased by introducing low-temperature exhaust gas from the chlorine bypass facility, resulting in decreased amount of clinker production in the cement kiln.

The present invention has been made in consideration of the above problems in the conventional art, and the object thereof is to treat chlorine bypass dust while preventing increases in chemical cost and concentrations of heavy metals in clinker, and ensuring stability in quality of cement, and to treat chlorine bypass exhaust gas while avoiding coating troubles in a cement kiln etc., and preventing heat losses in a preheater etc., without degradation of clinker production amount.

To achieve the above object, the present invention relates to a method of treating chlorine bypass dust and chlorine bypass exhaust gas, and the method is characterized by, in a chlorine bypass facility extracting a part of combustion gas, while cooling it, from a kiln exhaust gas passage, which runs from an inlet end of a cement kiln to a bottom cyclone, and recovering a chlorine bypass dust from the extracted gas, slurring the recovered chlorine bypass dust, and contacting the slurry with the exhaust gas from the chlorine bypass facility.

And, with the present invention, contacting a slurry containing chlorine bypass dust with an exhaust gas from chlorine bypass facility allows CaO and $Ca(OH)_2$ contained in the slurry to be gypsum ($CaSO_4$) though reaction with $SO_2$ in the exhaust gas, so that the contents of CaO and $Ca(OH)_2$ in the slurry can be decreased. In addition, reaction with $SO_2$ gas contained in the chlorine bypass exhaust gas enables desulfurization treatment of acidic gas (SOx) contained in the gas exhausted from the chlorine bypass facility at low cost while suppressing heat loss.

In the above method of treating chlorine bypass dust and chlorine bypass exhaust gas, the recovered chlorine bypass dust can be slurried after classified, and the slurry can be contacted with the exhaust gas from the chlorine bypass facility. With this, the content of CaO in the chlorine bypass dust to be slurried is controlled, which can efficiently control pH of the slurry after contacted with the gas exhausted from the chlorine bypass facility.

In addition, a classification point when the chlorine bypass dust is classified can be controlled by an amount of $SO_2$ contained in the exhaust gas from the chlorine bypass facility for contacting to the slurry (a product of an amount of the exhaust gas from the chlorine bypass facility and $SO_2$ concentration in the exhaust gas). With this, pH of the slurry after contacted with the exhaust gas from the chlorine bypass facility can efficiently be controlled. In this case, the classification point can be determined such that 70 mass percent or more and 100 mass percent or less of the recovered chlorine bypass dust passes through 10 μm mesh.

Further, in the above method of treating chlorine bypass dust and chlorine bypass exhaust gas, a coarse powder that is classified before recovering the chlorine bypass dust from the extracted gas can be further classified, and a fine powder obtained by the second classification can be slurried together with the chlorine bypass dust, and the slurry can be contacted with the exhaust gas from the chlorine bypass facility. With this method, it becomes easy to cope with the case that controlling pH of the slurry after contacted with the gas extracted from chlorine bypass facility is difficult by the slurry of the recovered chlorine bypass dust only.

The pH of the slurry being contacted with the exhaust gas from the chlorine bypass facility can be adjusted to 3.0 or more and 10.5 or less. When the pH is less than 3.0 the effect of desulfurizing the exhaust gas from the chlorine bypass facility decreases, and the pH exceeding 10.5 is not desirable since scale troubles occur in devices for handling the slurry.

In addition, pH of the slurry after contacted with the exhaust gas from the chlorine bypass facility can be adjusted to 7.0 or more and 10.5 or less. The pHs less than 7.0 and exceeding 10.5 are not desirable since insolubilizations of heavy metals become insufficient.

Further, a solid content can be obtained by solid/liquid separating the slurry after contacted with the exhaust gas from the chlorine bypass facility and can be fed to a cement finishing process. This solid content contains small amounts of CaO and $Ca(OH)_2$, so when added to the cement, quality of the cement can be maintained in stable condition. In addition, this solid content is not returned to a cement raw material system, which prevents chemical cost and heavy metals concentrations in clinker from increasing.

In addition, the above method of treating chlorine bypass dust and chlorine bypass exhaust gas may comprise the steps of: slurring the recovered chlorine bypass dust; dewatering the slurry; dissolving obtained cake again; and performing desulfurization of the exhaust gas from the chlorine bypass facility by contacting the slurry in which the cake dissolves again with the exhaust gas.

With this method, since the exhaust gas from the chlorine bypass is not returned to the cement kiln system, the chlorine bypass exhaust gas can be treated while avoiding coating troubles in the cement kiln and a preheater, and preventing heat losses in the preheater etc. without degradation of clinker production amount.

In addition, after the chlorine bypass dust is slurried, a cake obtained by dewatering the slurry is dissolved again, and the slurry in which the cake dissolved again is used for desulfurization of the chlorine bypass exhaust gas, so that the chlorine bypass exhaust gas can be treated while minimizing dissolution of gypsum that may cause scale troubles, and controlling generation of syngenite ($K_2Ca(SO_4)_2$) that may decrease concrete strength.

In the above method of treating chlorine bypass dust and chlorine bypass exhaust gas, a coarse powder that is classified before recovering the chlorine bypass dust from the extracted gas is further classified; a fine powder obtained by the second classification is slurried together with the chlorine bypass dust; the slurry is dewatered; an obtained cake is dissolved again; and the slurry in which the cake is dissolved again is contacted with the exhaust gas from the chlorine bypass facility for desulfurization. With this method, it becomes easy to cope with the case that desulfurization of the chlorine bypass exhaust gas cannot be fully performed by the recovered chlorine bypass dust slurry only without separately purchasing chemical agent such as hydrated lime.

In the above method of treating chlorine bypass dust and chlorine bypass exhaust gas, potassium concentration and chlorine concentration of the slurry in which the chlorine bypass dust is dissolved or/and the slurry, in which the cake obtained by slurring the chlorine bypass dust and dewatering it is dissolved again, can be adjusted to 6% or less, which suppresses the generation of syngenite. In addition, adjusting $SO_4^{2-}$ concentration of the slurry to 10000 mg/L or less allows the generation of syngenite to be suppressed.

In addition, purity of gypsum that is obtained by solid/liquid separating the slurry in which the chlorine bypass dust is dissolved or/and the slurry that is generated by contacting the slurry, in which the cake obtained by slurring the chlorine bypass dust and dewatering the slurry is dissolved again, with the exhaust gas from the chlorine bypass facility can be adjusted to 75% or more.

In addition, the present invention relates to an apparatus for treating chlorine bypass dust and chlorine bypass exhaust that is attached to a chlorine bypass facility extracting a part of combustion gas, while cooling it, from a kiln exhaust gas passage, which runs from an inlet end of a cement kiln to a bottom cyclone, and recovering chlorine bypass dust from the extracted gas comprising: a dissolution reaction tank for contacting the recovered chlorine bypass dust with an exhaust gas from the chlorine bypass facility; and a solid/liquid separator for solid/liquid separating a slurry discharged from the dissolution reaction tank. With the present invention, in the dissolution tank, contacting the slurry including the chlorine bypass dust and the exhaust gas from the chlorine bypass facility with each other allows CaO and $Ca(OH)_2$ contained in the slurry to be converted to $CaSO_4$ through reaction with $SO_2$ contained in the exhaust gas, and solid/liquid separation of the slurry in the solid/liquid separator allows a solid content with low CaO and $Ca(OH)_2$ contents to be obtained. In addition, utilization of $SO_2$ contained in the exhaust gas from the chlorine bypass facility makes it possible to treat acidic gas (SOx) while suppressing heat loss at low cost also.

Further, the present invention relates to an apparatus for treating chlorine bypass dust and chlorine bypass exhaust gas that is attached to a chlorine bypass facility extracting a part of combustion gas, while cooling it, from a kiln exhaust gas passage, which runs from an inlet end of a cement kiln to a bottom cyclone, and recovering chlorine bypass dust from the extracted gas comprising: a first dissolution tank for slurring the recovered chlorine bypass dust; a solid/liquid separator for solid/liquid separating a slurry generated in the first dissolution tank; a second dissolution tank for dissolving a cake generated in the solid/liquid separator again; a dissolution reaction tank for contacting the slurry after the cake is dissolved again, which is generated in the second dissolution tank, with the exhaust gas from the chlorine bypass facility to perform desulfurization of the exhaust gas. With this invention, in the same manner as the above invention, the chlorine bypass exhaust gas can be treated while minimizing dissolution of gypsum that may cause scale trouble, and controlling generation of syngenite.

The above apparatus for treating chlorine bypass dust and chlorine bypass exhaust gas may comprise a salt recovering device for recovering a salt from a filtrate discharged from the solid/liquid separator and a gas-gas heater for utilizing a heat recovered from the exhaust gas for recovering the salt in the salt recovering device. With this, salt can be recovered while utilizing heat of the extracted combustion gas.

The gas-gas heater can recover heat from the exhaust gas from a high-temperature dust collector for collecting dust from the extracted gas, and thermal efficiency advances by recovering heat from a high-temperature gas from which dust is collected.

As described above, with the present invention, it becomes possible to treat chlorine bypass dust while preventing increases in chemical cost and concentrations of heavy metals in clinker, and ensuring stability in cement quality, and to treat chlorine bypass exhaust gas while avoiding coating troubles in a cement kiln etc., and preventing heat losses in a preheater etc., without decreasing the amount of clinker production.

Next, embodiments to carry out the present invention will be explained in detail with reference to drawings.

DETAILED DESCRIPTION OF THE INVENTION

Figure 1:
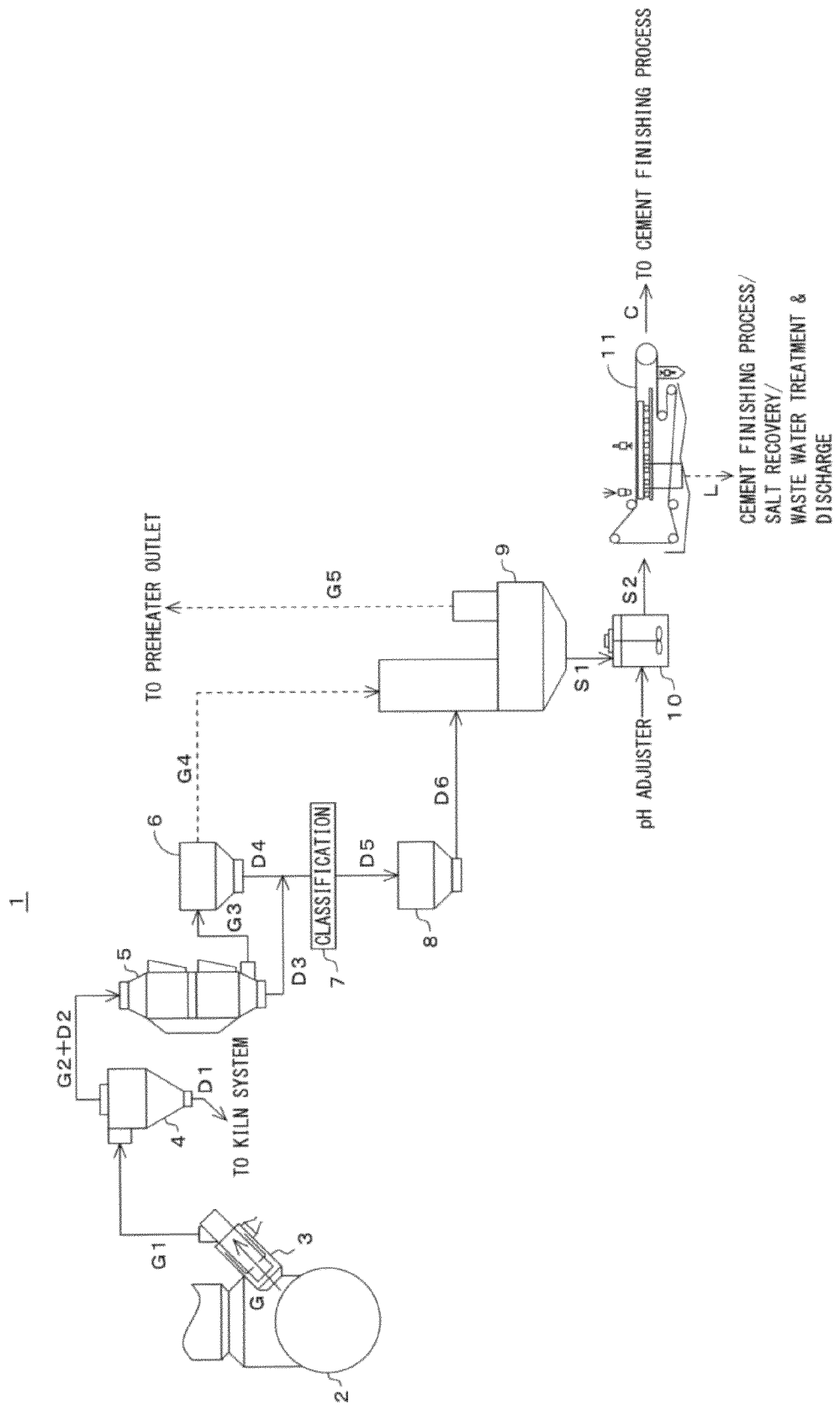
FIG. 1 is a schematic view showing a chlorine bypass dust and chlorine bypass exhaust gas treatment apparatus according to the first embodiment of the present invention.

FIG. 1 shows a chlorine bypass facility with an apparatus for treating chlorine bypass dust and chlorine bypass exhaust gas according to the first embodiment of the present invention, and this chlorine bypass facility 1 comprises: a probe 3 for extracting a part G of combustion gas, while cooling it, from a kiln exhaust gas passage, which runs from an inlet end of a cement kiln 2 to a bottom cyclone (not shown); a cyclone 4 for separating a coarse powder D1 from dust included in an extracted gas G1 extracted by the probe 3; a heat exchanger 5 for cooling an extracted combustion gas G2 including a fine powder D2 discharged from the cyclone 4; a bag filter 6 for collecting dust contained in an extracted gas G3 from the heat exchanger 5; a classifier 7 for classifying dusts (D3+D4) discharged from the heat exchanger 5 and the bag filter 6; a dust tank 8 for temporarily storing a dust D5 discharged from the classifier 7; a dissolution reaction tank 9 for dissolving a dust (chlorine bypass dust) D6 discharged from the dust tank 8 with water, and contacting the slurry with an exhaust gas G4 from the bag filter 6; an adjustment tank 10 for controlling pH of a slurry S1 discharged from the dissolution reaction tank 9, and insolubilizing heavy metals contained in the slurry 51; a solid/liquid separator 11 for solid/liquid separating a slurry S2 discharged from the adjustment tank 10; and so on. The construction from the probe 3 to the bag filter 6 is the same as that of conventional chlorine bypass facilities, so that explanations thereof will be omitted.

The classifier 7 classifies the dusts (D3+D4) discharged from the heat exchanger 5 and the bag filter 6, and as described below, controls the amount of CaO fed to the dissolution reaction tank 9 by adjusting particle size distribution of the dust D5 that is fed to the dissolution reaction tank 9. As the classifier 7, any device capable of adjusting particle size distribution of a dust fed thereto such as an inertial classifier (an air separator, a Sturtevant separator, a hide-type separator etc.), a centrifugal separator (a micron separator, a turbo classifier etc.) or the like can be used, and these devices may be used in two or some stages.

The dissolution reaction tank 9 is installed to slurry the dust D6 from the dust tank 8 with water (or hot water), and to the dissolution reaction tank 9 is supplied the exhaust gas G4 including $SO_2$ gas from the bag filter 6, which allows calcium compounds contained in the slurry and $SO_2$ gas to react with each other. In this connection, as the dissolution reaction tank 9 may be used a packed tower, a perforated-plate tower, a venturi scrubber, a spray tower, a mixing-type scrubber, a diffusion plate or the like, and those may be any one of continuous type and batch type. It makes no difference whether the dust D6 is fed to the dissolution reaction tank 9 after slurried or the dust D6 is directly fed to the dissolution tank 9 so as to be slurried therein.

The adjustment tank 10 is installed to control pH of the slurry S1 by adding a pH adjuster to the slurry S1 discharged from the dissolution reaction tank 9, and to insolubilize heavy metals such as lead therein. As the pH adjuster, NaOH, $Ca(OH)_2$, CaO, $Mg(OH)_2$, sulfuric acid etc. can be used.

The solid/liquid separator 11 is installed to solid/liquid separate the slurry S2 discharged from the adjustment tank 10, and a filter press, a centrifugal separator, a belt filter, or the like may be used as the solid/liquid separator 11.

Next, the motion of the chlorine bypass facility 1 with the above-mentioned construction will be explained with reference to FIG. 1.

The part G of the combustion gas extracted from the kiln exhaust gas passage, which runs from the inlet end of the cement kiln 2 to the bottom cyclone, is cooled in the probe 3 with a cooling air from a cooling fan (not shown), and fine crystals of chloride compounds are generated. These fine crystals of chloride compounds are unevenly distributed on the fine powder side of the dust included in the extracted gas G1, so that the coarse powder D1 separated by the cyclone 4 is returned to the cement kiln system.

The extracted gas G2 containing the fine powder D2 separated by the cyclone 4 is introduced to the heat exchanger 5 to perform heat exchange between the extracted gas G2 and a medium. The extracted gas G3 cooled by the heat exchange is introduced to the bag filter 6, and the dust D4 contained in the extracted gas G3 is collected in the bag filter 6. The dust D4 collected in the bag filter 6 is classified in the classifier 7 together with the dust D3 discharged from the heat exchanger 5, and they are temporarily stored in the dust tank 8, and are introduced to the dissolution reaction tank 9. In addition, a classification point of the classifier 7 will be described below.

The dust D6 introduced to the dissolution reaction tank 9 becomes the slurry after mixed with water in the dissolution reaction tank 9. Here, in the slurry exist CaO, $CaCO_3$ and $Ca(OH)_2$ as calcium compounds in a mixed state, and CaO and $Ca(OH)_2$ are converted into $CaSO_4$ and $CaCO_3$ after reacting with $SO_2$ contained in the exhaust gas G4. At the reaction between CaO, $Ca(OH)_2$ and $SO_2$, residence time of the slurry in the dissolution reaction tank 9, the amount of the dust D6 inputted thereto and feed rate of the slurry in which the dust D6 is dissolved are adjusted based on the rate of decrease of the exhaust gas G4 (the rate of decrease of the $SO_2$ gas), pH of the slurry in the dissolution reaction tank 9, chemical analysis value of the dust D6, and so on.

In the dissolution reaction tank 9, the pH of the slurry in the reaction tank is controlled between 3 and 10.5, preferably between 3 and 7, more preferably between 3 and 6 under operation. In case that the pH of the slurry is less than 3, desulfurization effect by the exhaust gas from the chlorine bypass facility decreases. When the pH of the slurry exceeds 10.5 scale troubles may occur in devices for handling the slurry.

Figure 2:
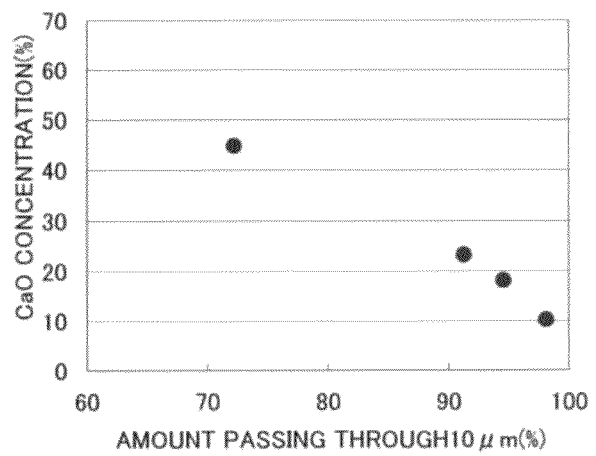
FIG. 2 is a graph showing the relation between amount (mass percent) of a dust extracted from a cement kiln passes through 10 μm mesh and CaO concentration of the dust.

In addition, the classification point of the classifier 7 is controlled based on the amount of $SO_2$ (product of treated gas amount and $SO_2$ concentration therein) contained in the exhaust gas G4 fed to the dissolution reaction tank 9 and the amount of CaO (product of concentration and the amount of dust) contained in the dust D5 fed to the dissolution reaction tank 9. In other words, while the pH of the slurry in the dissolution reaction tank 9 is controlled so as to become constant, when the amount of $SO_2$ ($SO_2$ concentration can be substituted if the treated gas amount is constant) introduced to the dissolution reaction tank 9 is increased, or when it is desired to raise the pH of the slurry in the dissolution reaction tank 9, it is necessary to increase the amount of CaO contained in the dust D6, so that the classification point of the classifier 7 should be changed. Here, there is a correlative relationship shown in FIG. 2 between the amount (mass percent) of the dust D6 passing through 10 μm mesh and CaO concentration therein. Utilizing this relationship, the classification point of the classifier 7 can be controlled by the amount of the dust D6 passing through 10 μm mesh, for example, the classification point may be adjusted such that the amount becomes 70 mass percent to 100 mass percent.

Next, the slurry S1 discharged from the dissolution reaction tank 9 is fed to the adjustment tank 10, and the pH of the slurry S1 is controlled from 7 to 10.5 by adding alkali source thereto, and heavy metals such as lead, cadmium, copper, zinc and the like are insolubilized. The exhaust gas G5 from the dissolution reaction tank 9 is introduced to an outlet of a preheater attached to the cement kiln 2.

Next, the slurry S2 discharged from the adjustment tank 10 is solid/liquid separated in the solid/liquid separator 11, and obtained solid content C is fed to a cement finishing process. On the other hand, in a filtrate L discharged from the solid/liquid separator 11 are included salt and heavy metals, so that the salt and the heavy metals are treated by adding the filtrate L to a cement finishing process while considering quality of cement as a product. Meanwhile, the filtrate L that cannot be added to the cement finishing process is released after the salt and heavy metals recovered therefrom.

As described above, in this embodiment, CaO and the $Ca(OH)_2$, which may affect quality of cement when added thereto, are reacted with $SO_2$ to convert them to $CaSO_4$, and then the solid content obtained by dehydration is supplied to the cement finishing process, so that it becomes possible to produce cement with low CaO and $Ca(OH)_2$ contents, which does not affect property such as setting time and ensures stability in cement quality.

In addition, the above solid content is not returned to a cement material system, which does not cause circulation and condensation of heavy metals in a cement burning system to decrease chemical cost for waste water treatment without increase of concentrations of the heavy metals in clinker.

Further, in the exhaust gas G4 including $SO_2$ gas from the bag filter 6, that is, in the exhaust gas from the chlorine bypass facility 1 is contained acidic gases (SOx), and the exhaust gas is used for reaction with CaO and the $Ca(OH)_2$, which can treat the acidic gases at low cost while suppressing heat loss without increasing environment load.

Figure 3:
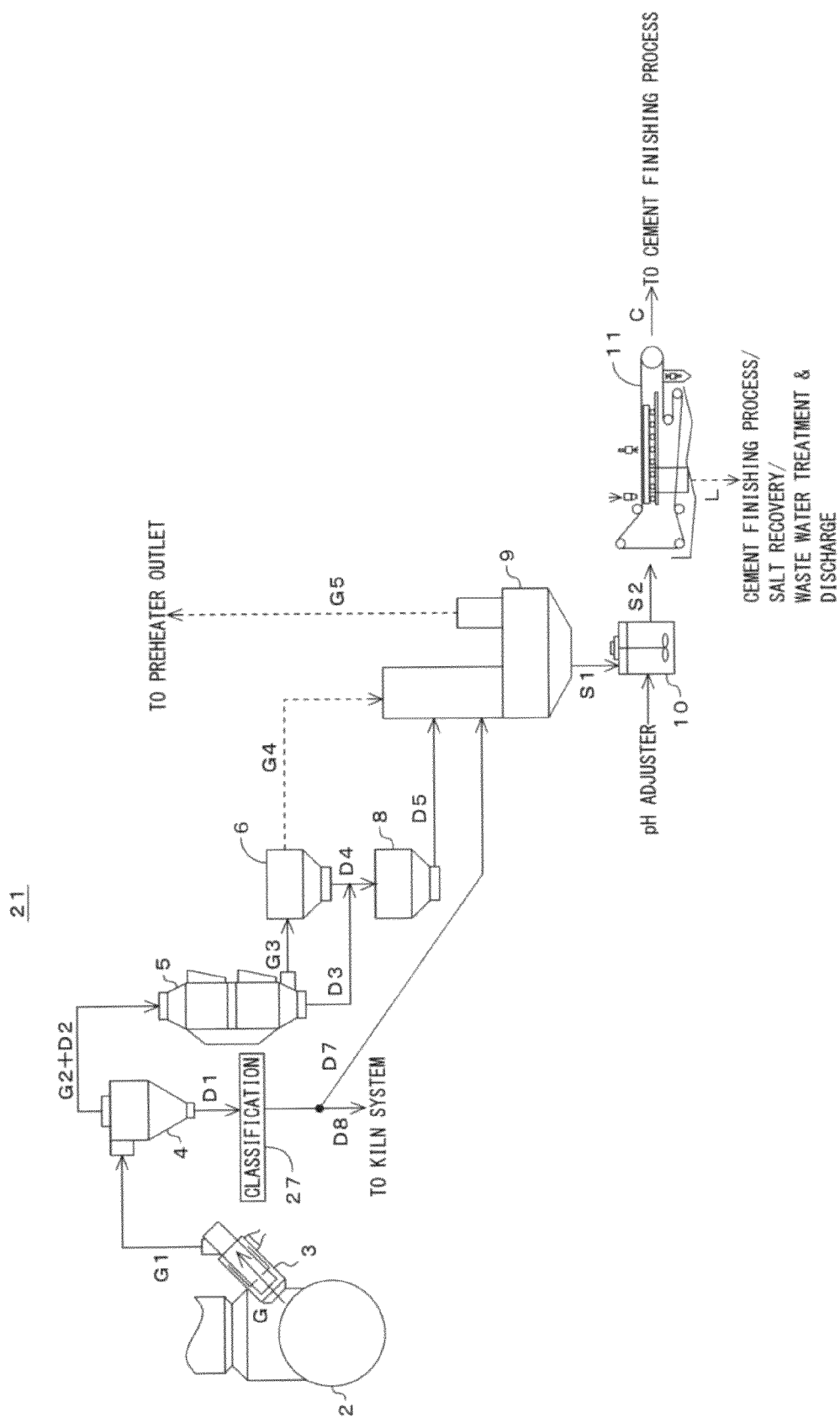
FIG. 3 is a schematic view showing a chlorine bypass dust and chlorine bypass exhaust gas treatment apparatus according to the second embodiment of the present invention.

Next, an apparatus for treating chlorine bypass dust and chlorine bypass exhaust gas according to the second embodiment of the present invention will be explained with reference to FIG. 3. This chlorine bypass facility 21 differs from the chlorine bypass facility 1 shown in FIG. 1 in the points that the classifier 7 arranged in the rear stage of the heat exchanger 5 and the bag filter 6 is not installed; a classifier 27 for classifying the coarse powder D1 discharged from the cyclone 4 is installed; and a route for introducing a fine powder D7 classified in the classifier 27 to the dissolution reaction tank 9 is installed, and other components are the same as those of the above-mentioned chlorine bypass facility 1. Then, in FIG. 3, to the same components as the chlorine bypass facility 1 shown in FIG. 1 are attached the same symbols, and explanations thereof will be omitted.

The classifier 27 is installed to classify the coarse powder D1 discharged from the cyclone 4; feed the divided fine powder D7 to the dissolution reaction tank 9; and return a coarse powder D8 to a cement kiln system. As this classifier 27 can be used a device the same as the classifier 7 shown in FIG. 1.

Next, the motion of the chlorine bypass facility 21 with the above-mentioned construction will be explained with reference to FIG. 3.

The part G of the combustion gas extracted from the kiln exhaust gas passage, which runs from the inlet end of the cement kiln 2 to the bottom cyclone, is cooled in the probe 3 with a cooling air from a cooling fan (not shown), and fine crystals of chloride compounds are generated. These fine crystals of chloride compounds are unevenly distributed on the fine powder side of the dust included in the extracted gas G1, so that the extracted gas G1 is separated into a coarse powder D1 and an extracted gas G2 including a fine powder D2 by the cyclone 4, and the coarse powder D1 is fed to the classifier 27, and the extracted gas G2 including the fine powder D2 is introduced to the heat exchanger 5. In addition, a classification point and a motion of the classifier 27 will be described below.

In the heat exchanger 5, heat exchange between the extracted gas G2 and a medium is performed, and an extracted gas G3 cooled by the heat exchange is introduced to the bag filter 6, and a dust D4 contained in the extracted gas G3 is collected in the bag filter 6. The dust D4 collected in the bag filter 6 is temporarily stored together with the dust D3 discharged from the heat exchanger 5 in the dust tank 8, and a dust D5 (D3+D4) is introduced to the dissolution reaction tank 9.

The dust D5 introduced to the dissolution reaction tank 9 becomes slurry after mixed with water in the dissolution reaction tank 9. Here, in the slurry exist CaO, $CaCO_3$ and $Ca(OH)_2$ as calcium compounds in a mixed state, and CaO and $Ca(OH)_2$ are converted into $CaSO_4$ after reacting with $SO_2$ contained in the exhaust gas G4. At the reaction between CaO, $Ca(OH)_2$ and $SO_2$, residence time of the slurry in the dissolution reaction tank 9, the amount of the dust D5 inputted thereto and the amount of the slurry, in which the dust D5 are dissolved thereto are adjusted based on the rate of decrease of the exhaust gas G4 (rate of decrease of the $SO_2$ gas), the pH of the slurry in the dissolution reaction tank 9, chemical analysis value of the dust D5, and so on.

The classifier 27 is controlled based on the amount of $SO_2$ (product of treated gas amount and $SO_2$ concentration therein) contained in the exhaust gas G4 that is introduced to the dissolution reaction tank 9 and the amount of CaO (product of concentration thereof and dust content) contained in the dust D5 introduced to the dissolution reaction tank 9. In other words, while the pH of the slurry in the dissolution reaction tank 9 is controlled so as to become constant, when the amount of $SO_2$ gas introduced to the dissolution reaction tank 9 is increased, or when it is desired to raise the pH of the slurry in the dissolution reaction tank 9, it is necessary to increase the amount of CaO contained in the dust D7, so that the classification point the classifier 27 should be changed in the manner described below, and the fine powder D7 is added to the dissolution reaction tank 9.

As described above, fine crystals of chloride compounds that are generated when cooled in the probe 3 are unevenly distributed on the fine powder side of the dust included in the extracted gas G1, so that it is preferable to introduce the fine powder D7 including more fine powder to the dissolution reaction tank 9 from the viewpoint of chlorine removal.

Figure 4:
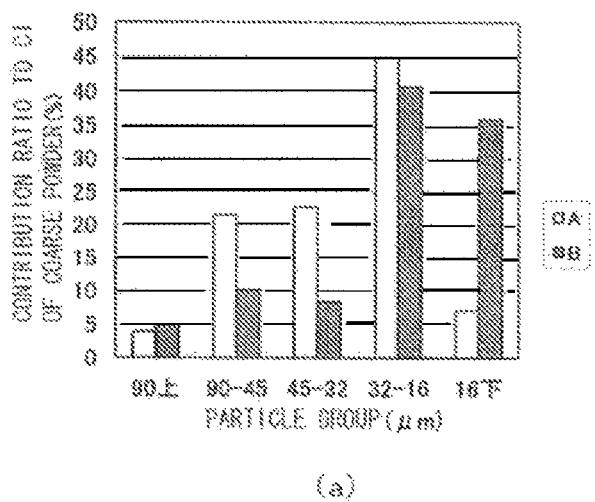
FIG. 4 (a) is a graph showing contribution ratio of coarse powder to Cl according to each particle group, and (b) is a graph showing particle size distribution of the coarse powder.
Figure 4:
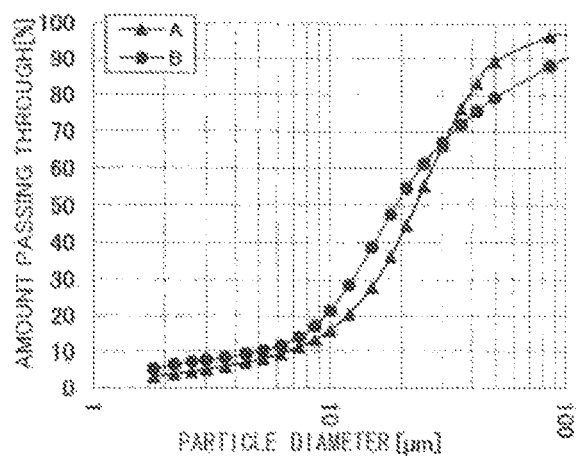

FIG. 4 shows a graph for comparing particle size distributions, chlorine concentrations, and others of two kinds of coarse powders D1 (coarse powder A and coarse powder B) classified in the cyclone 4.

FIG. 4 (a) shows contribution ratio between particle group of coarse powders A, B and chlorine contained in the coarse powder (coarse powder C1). To make the graph, firstly, (1) the particle size distribution (weight ratio) of the coarse powder is calculated by sieving it with respect to each particle size, (2) chlorine concentration is measured with respect to each particle size, (3) chlorine content (product of weight thereof and chlorine concentration) with respect to each particle size is calculated, (4) contribution ratio (quotient of chlorine content in the particle group and the total amount of the chlorine) for the amount of chlorine contained in the coarse powder is calculated. With this graph, it is understood that the contribution ratio of the dust to Cl whose particle size is 32 μm or less is high. In addition, FIG. 4 (b) shows the particle size distributions of the coarse powders A, B, and Table 1 shows contents of chlorine and CaO with respect to each coarse powder A, B, and chlorine concentration of chlorine bypass dust when each coarse powder is obtained.

TABLE 1

| COARSE POWDER | Cl (MASS %) | CaO (MASS %) | Cl of CHLORINE BYPASS DUST (D5 + D6) (MASS %) |
| --- | --- | --- | --- |
| A | 2.1 | 56.6 | 20.4 |
| B | 1.6 | 52.9 | 10.0 |

As described above, with the present embodiment, the coarse powder D1 discharged from the cyclone 4 is classified by the classifier 27, and the separated fine powder D7 is fed to the dissolution reaction tank 9, which makes it possible to flexibly cope with the case that the amount of CaO is insufficient by feeding the dust D5 from the dust tank 8 only to the dissolution reaction tank 9.

In addition, in the above embodiments, the cases that classifiers 7, 27 are separately installed to the chlorine bypass facilities 1, 21 are exemplified, but both of the classifiers 7, 27 may be installed in a chlorine bypass facility. Further, even if both of the classifier 7, 27 are not installed thereto, the chlorine bypass dust collected in the dust tank 8 is slurried, and the slurry is contacted with the exhaust gas (the exhaust gas G4 from the bag filter 6) from the chlorine bypass facility, which generates gypsum ($CaSO_4$) by reacting CaO and $Ca(OH)_2$ contained in the slurry in the dissolution reaction tank 9 with $SO_2$ contained in the exhaust gas. With this, it becomes possible that: contents of CaO and $Ca(OH)_2$ of the slurry are deceased; acidic gases (SOx) contained in the exhaust gas from the chlorine bypass facility is treated at low cost while suppressing heat losses; circulation and condensation of heavy metals in the cement burning system are avoided; chemical cost of waste water treatment is decreased; and increase of heavy metals in clinker is avoided.

Figure 5:
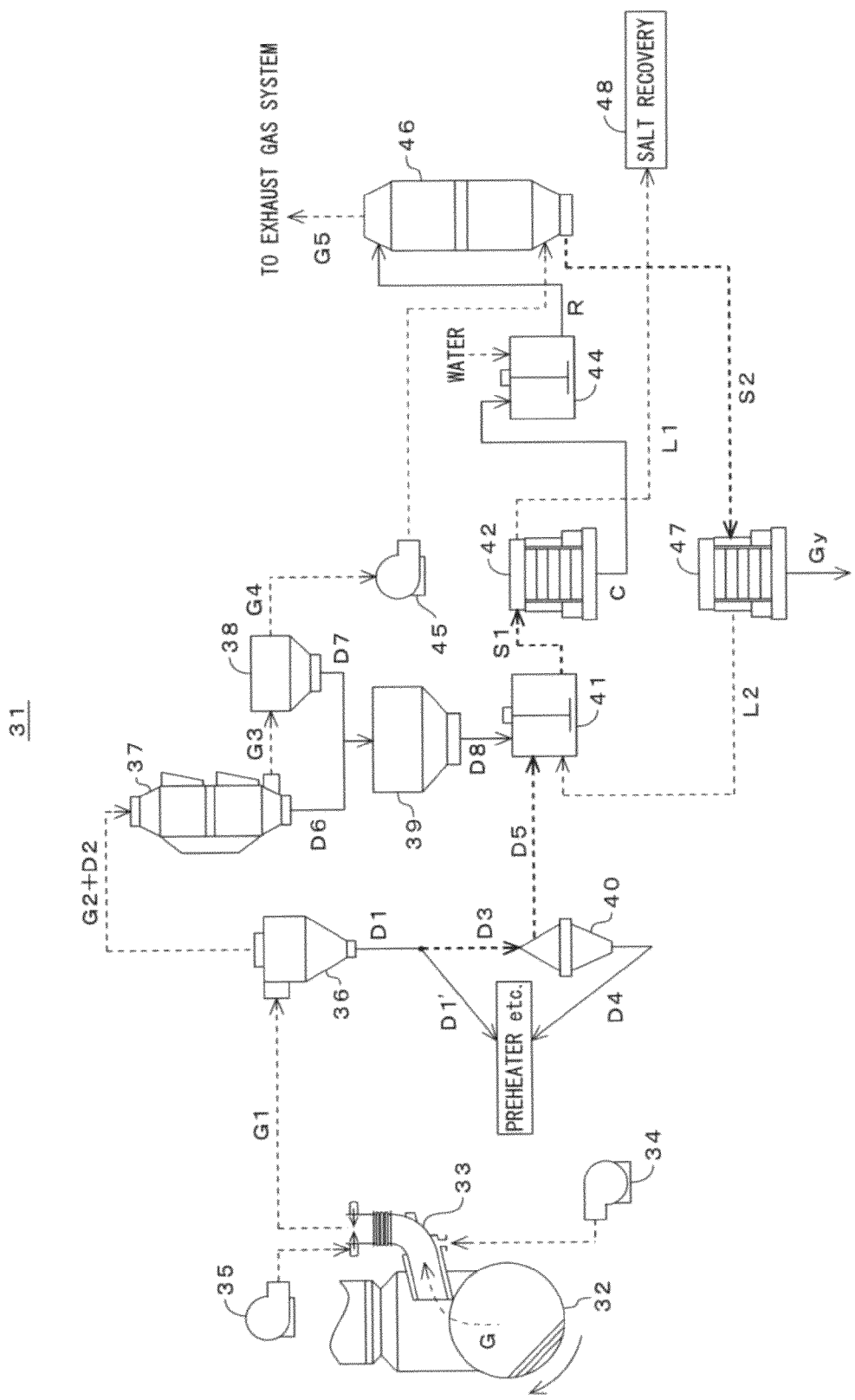
FIG. 5 is a flow chart showing a chlorine bypass dust and chlorine bypass exhaust gas treatment apparatus according to the third embodiment of the present invention.

FIG. 5 shows a chlorine bypass facility with an apparatus for treating chlorine bypass dust and chlorine bypass exhaust gas according to the third embodiment of the present invention, and this chlorine bypass facility 31 comprises: a probe 33 for extracting a part G of combustion gas, while cooling it by cooling airs from the cooling fans 34, 35, from a kiln exhaust gas passage, which runs from an inlet end of a cement kiln 32 to a bottom cyclone (not shown); a cyclone 36 for separating coarse powder D1 from a dust included in an extracted gas G1 extracted by the probe 33; a classifier 40 for classifying coarse powder D3 partly obtained from the coarse powder D1 from the cyclone 36; a cooler 37 for cooling an extracted gas G2 including fine powder D2 discharged from the cyclone 36; a bag filter 38 for collecting dust contained in the extracted gas G3 from the cooler 37; a dust tank 39 for storing dusts (D6+D7) discharged from the cooler 37 and the bag filter 38; a first dissolution tank 41 for dissolving a chlorine bypass dust (chlorine bypass dust) D8 and the like discharged from the dust tank 39 with a filtrate L2 from the second solid/liquid separator 47; a first solid/liquid separator 42 for solid/liquid separating a slurry S1 discharged from the first dissolution tank 41; a second dissolution tank 44 for dissolving a cake C discharged from the first solid/liquid separator 42 again (repulping); a dissolution reaction tank 46 for desulfurizing the exhaust gas (chlorine bypass exhaust gas) G4 from the bag filter 38 with the repulped slurry R discharged from the second dissolution tank 44; a second solid/liquid separator 47 for solid/liquid separating the slurry S2 discharged from the dissolution reaction tank 46; a salt recovery device 48 for recovering salt from the filtrate L1 discharged from the first solid/liquid separator 42; and so on. The construction from the probe 33 to the dust tank 39 is the same as that of conventional chlorine bypass facilities, so that explanations thereof will be omitted.

The classifier 40 is installed to classify the coarse powder D3 that is partly obtained from the coarse powder D1 discharged from the cyclone 36, and the fine powder D5 classified in the classifier 40 is fed to the first dissolution tank 41, and the coarse powder D4 is returned to a preheater and the like attached to a cement kiln 32 as a cement raw material. In addition, an excess of the coarse powder D1 discharged from the cyclone 36 is not fed to the classifier 40, but is returned as a coarse powder D1' as it is for a cement raw material to the preheater or the like.

The first dissolution tank 41 is installed to slurry the dust D8 from the dust tank 39 and the fine powder D5 from the classifier 40 with a filtrate L2 from the second solid/liquid separator 47.

The first solid/liquid separator 42 is installed to solid/liquid separate the slurry S1 discharged from the first dissolution tank 41. The cake C obtained by solid/liquid separation is fed to the second dissolution tank 44, and the filtrate L1 is fed to the salt recovery device 48.

The second dissolution tank 44 is installed to dissolve the cake C discharged from the first solid/liquid separator 42 again, and the repulped slurry R is utilized for desulfurization of the extracted gas G4 from the bag filter 38 in the dissolution reaction tank 46.

The dissolution reaction tank 46 is installed to desulfurize the exhaust gas G4 that is fed from the bag filter 38 via a fan 45 by utilizing the repulped slurry R that is fed from the second dissolution tank 44. The slurry S2 including dihydrate gypsum generated by the desulfurization is returned to the second solid/liquid separator 47, and desulfurized exhaust gas G5 is returned to an exhaust gas system of the cement kiln 32.

The second solid/liquid separator 47 is installed to solid/liquid separate the slurry S2 fed from the dissolution reaction tank 46, and the filtrate L2 obtained by solid/liquid separation is reused in the first dissolution tank 41, and dihydrate gypsum Gy is recovered in a cake obtained by the solid/liquid separation.

The salt recovery device 48 is installed to recover a salt contained in the filtrate L1 discharged from the first solid/liquid separator 42.

Next, the motion of the chlorine bypass facility 31 with the above-mentioned construction will be explained with reference to FIG. 5.

The part G of the combustion gas extracted from the kiln exhaust gas passage, which runs from the inlet end of the cement kiln 2 to the bottom cyclone, is cooled in the probe 33 with cooling airs from cooling fans 34, 35. With this, fine crystals of chloride compounds are generated. These fine crystals of chloride compounds are unevenly distributed on the fine powder side of the dust included in the extracted gas G1, so that the coarse powder D1 classified by the cyclone 36 is returned as a cement raw material (D1') to the preheater or the like attached to the cement kiln 32, or a coarse powder (D3) partly obtained from the coarse powder D1 is fed to the classifier 40 to utilize it for desulfurization as described below.

The extracted gas G2 including the fine powder D2 separated by the cyclone 36 is introduced to the cooler 37 to perform heat exchange between the extracted gas G2 and a medium. The extracted gas G3 cooled by the heat exchange is introduced to the bag filter 38, and the dust D7 contained in the extracted gas G3 is collected in the bag filter 38. The dust D7 collected in the bag filter 38 is temporarily stored together with the dust D6 discharged from the cooler 37 in the dust tank 39, and a dust D8 (D6+D7) is introduced to the first dissolution tank 41.

On the other hand, a part of the coarse powder D1 discharged from the cyclone 36 is obtained, and is classified after fed to the classifier 40. The coarse powder D1' that is not partly obtained from the coarse powder D1 is directly returned as it is to the preheater attached to the cement kiln 32 and others. The fine powder D5 classified by the classifier 40 is fed to the first dissolution tank 41, and the coarse powder D4 is returned to the preheater or the like. In addition, details of a method of controlling the classifier 40 will be described below. Further, without obtaining a part of the coarse powder D1, but all of the amount of the coarse powder D1 may be fed to the classifier 40.

The fine powder D5 introduced to the first dissolution tank 41 and the dust D8 from the dust tank 39 become the slurry S1 in the first dissolution tank 41 after mixed with the filtrate L2 fed from the second solid/liquid separator 47.

Then, by the first solid/liquid separator 42 is solid/liquid separated the slurry S1 discharged from the first dissolution tank 41. A cake obtained by solid/liquid separating the slurry S1 is washed while solid/liquid separating the slurry S1 to remove chlorine content. The cake C from which the chlorine content is removed is fed to the second dissolution tank 44, and is dissolved again, and the repulped slurry R is fed to the dissolution reaction tank 46 for desulfurization. In addition, the desulfurized exhaust gas G5 is introduced to an exhaust gas system of the cement kiln 32.

Here, in the repulped slurry R exist CaO, $CaCO_3$ and $Ca(OH)_2$ as calcium compounds in a mixed state, and these are converted into dihydrate gypsum ($CaSO_4.2H_2O$) in the dissolution reaction tank 46 through reaction with $SO_2$ contained in the exhaust gas G4 from the bag filter 38. In this reaction, potassium content and chlorine content are removed in the first solid/liquid separator 42, so that chlorine content of the repulped slurry R is low, which can minimize dissolution of gypsum that may cause scale troubles as well as suppress generation of syngenite ($K_2Ca(SO_4)_2$).

Further, the classifier 40 is controlled based on the amount of $SO_2$ (product of treated gas amount and $SO_2$ concentration therein) contained in the exhaust gas G4 that is introduced to the dissolution reaction tank 46 and the amount of calcium (CaO, $Ca(OH)_2$ and $CaCO_3$) (product of Ca concentration in the solid content supplied to the repulped slurry R and the amount of solid content dissolved again (repulped)). In other words, when the amount of $SO_2$ gas introduced to the dissolution reaction tank 46 increases, it is necessary to increase the amount of calcium, which is contained in the repulped slurry R, contributing to desulfurization, so that the coarse powder D3 fed to the classifier 40 is increased, and the fine powder D5 obtained by the classification is added to the first dissolution tank 41.

In contrast, when the amount of $SO_2$ contained in the exhaust gas G4 decreases the coarse powder D3 fed to the classifier 40 is decreased, and the obtained fine powder D5 is added to the first dissolution tank 41, or no coarse powder D3 is supplied to the classifier 40 at all and only the dust D8 is used for the desulfurization.

In addition, the classification point of the above classifier 40 is controlled based on the amount of $SO_2$ (product of treated gas amount and $SO_2$ concentration therein) contained in the exhaust gas G4 that is introduced to the dissolution reaction tank 46 and the amount of CaO (for example, product of CaO concentration and dust content), which contributes to desulfurization, contained in the repulped slurry R introduced to the dissolution reaction tank 46. In other words, in case that the amount of $SO_2$ introduced to the dissolution reaction tank 46 (which may be substituted by $SO_2$ concentration when treated gas quantity is constant) increases, and the classification point of the classifier 40 is changed so as to increase the amount of CaO contained in the repulped slurry R. As described above, fine crystals of chloride compounds generated when cooled by the probe 33 are unevenly distributed on the fine powder side of the dust included in the extracted gas G1, therefore, in the fine powder D5 classified in the classifier 40 also, it is preferable to introduce one including more fine powder to the dissolution reaction tank 46 from the viewpoint of chlorine removal.

Table 2 shows pHs and chemical analysis values of the filtrates L2, and content ratios of syngenite and dihydrate gypsum contained in the cakes Gy after solid/liquid separating the slurries S2 obtained by changing mixing ratio of the dust (chlorine bypass dust) D8 from the dust tank 39 and water, and feeding them to the dissolve reaction tank 46, and controlling pH of the slurries from 4 to 6. As shown in the table, potassium and chlorine concentrations of the slurry R fed to the dissolve reaction tank 46, that is, the slurry in which the chlorine bypass dust is dissolved or/and the slurry in which a cake obtained by dewatering the slurry after slurring the chlorine bypass dust is dissolved again is 6 mass percent or less, which decreases the ratio of the amount of produced syngeite to the amount of produced dihydrate gypsum.

TABLE 2

| CHLORINE BYPASS DUST:WATER | pH | K (%) | Ca (mg/L) | Cl (%) | $SO_4^{2-}$ (mg/L) | SYNGENITE | DIHYDRATE GYPSUM |
|---|---|---|---|---|---|---|---|
| 1:3 | 5.2 | 9.8 | 2100 | 11.0 | 3500 | 1 | 0.2 |
| 1:3.8 | 5.2 | 8.4 | 2000 | 8.6 | 3800 | 1 | 0.2 |
| 1:6.3 | 5.4 | 5.5 | 1900 | 5.3 | 6400 | 0.2 | 1 |
| 1:10 | 5.0 | 3.3 | 1500 | 3.6 | 6000 | 0 | 1 |
| 1:15 | 5.3 | 2.3 | 1500 | 2.3 | 5400 | 0 | 1 |
| 1:20 | 5.2 | 1.7 | 1300 | 1.6 | 4400 | 0 | 1 |

Figure 6:
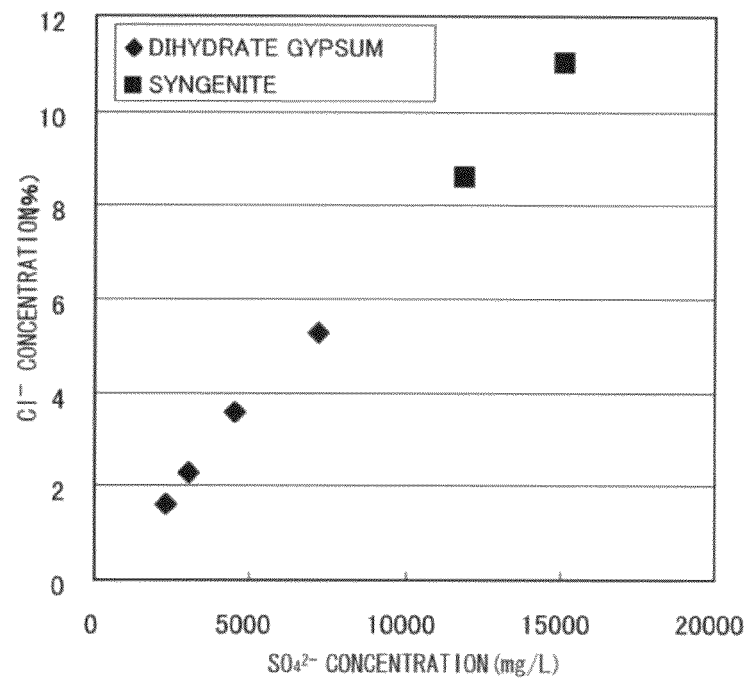
FIG. 6 is a graph showing the relation between $K^+$, $Cl^-$ and $SO_4^{2-}$ and amount of generated syngenite.
Figure 6:
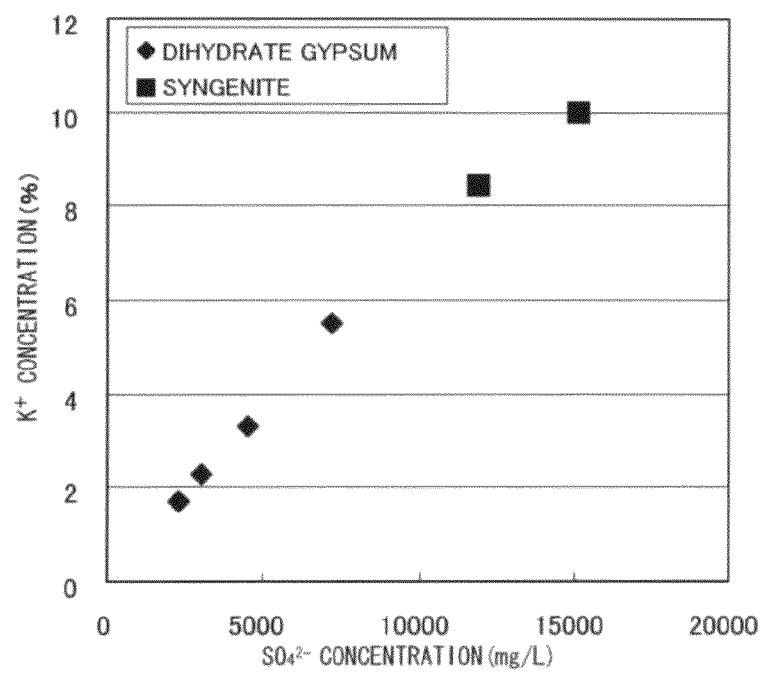

In addition, there is a relationship shown in FIG. 6 between $K^+$, $Cl^-$ and $SO_4^{2-}$ and the amount of syngenite produced, which are contained in the slurry in which the chlorine bypass dust is dissolved or/and in the slurry in which a cake obtained by dewatering the slurry after slurring the chlorine bypass dust is dissolved again, so that potassium and chlorine concentrations of the slurry R are adjusted 6 mass percent or less, and $SO_4^{2-}$ concentration of the slurry R is adjusted 10000 mg/l or less to suppress generation of syngenite.

Next, the slurry S2 discharged from the dissolution reaction tank 46 is solid/liquid separated by the second solid/liquid separator 47, and obtained filtrate L2 is reused in the first dissolution tank 41, and dihydrate gypsum Gy is recovered in the cake. The purity of the dihydrate gypsum Gy is 75 percent or more.

On the other hand, the filtrate L1 which is obtained by the solid/liquid separation in the solid/liquid separator 42 is fed to the salt recovery device 48, and salt therein is recovered, and the filtrate is released after waste water treatment.

Figure 7:
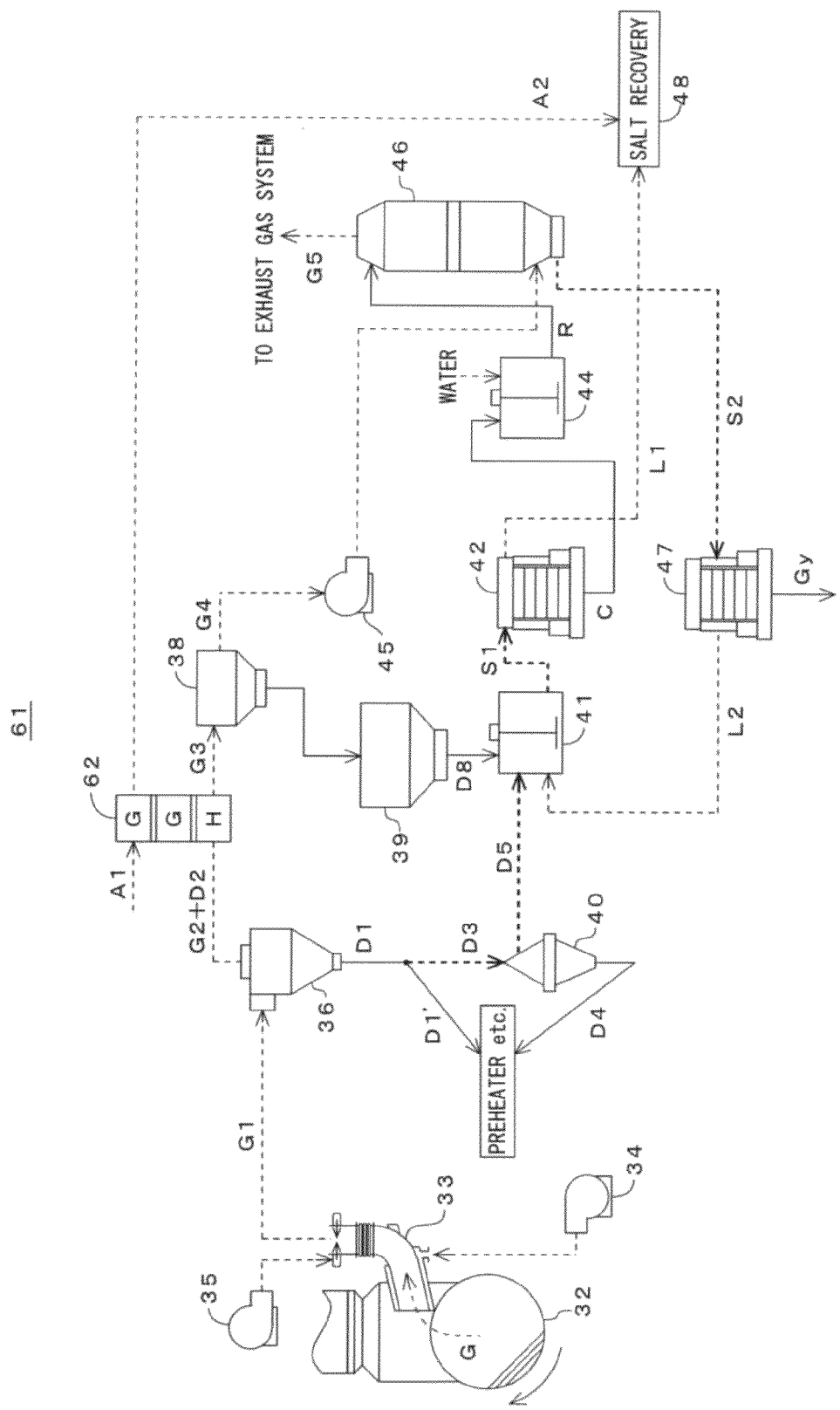
FIG. 7 is a flow chart showing a chlorine bypass dust and chlorine bypass exhaust gas treatment apparatus according to the forth embodiment of the present invention.

Next, an apparatus for treating chlorine bypass dust and chlorine bypass exhaust gas according to the forth embodiment of the present invention will be explained with reference to FIG. 7. In FIG. 7, to the same components as the chlorine bypass facility 31 shown in FIG. 5 are attached the same symbols, and explanations thereof will be omitted.

This chlorine bypass facility 61 is characterized by having a gas-gas heater 62 instead of the cooler 37 of the chlorine bypass facility 31, and other components are the same as those of the chlorine bypass facility 31.

The gas-gas heater 62 is installed to heat an air A1 taken from the circumference with an extracted gas G2 discharged from the cyclone 36, and to utilize a high-temperature air A2 heated by the gas-gas heater 62 in a salt recovery device that is arranged in the rear stage of the heater for salt recovery. With this, the chlorine bypass exhaust gas can be treated while effectively utilizing heat of the extracted combustion gas. In addition, the heat recovered by the gas-gas heater 62 may be utilized for raising temperature of the exhaust gas G5 from the dissolution reaction tank 46.

Figure 8:
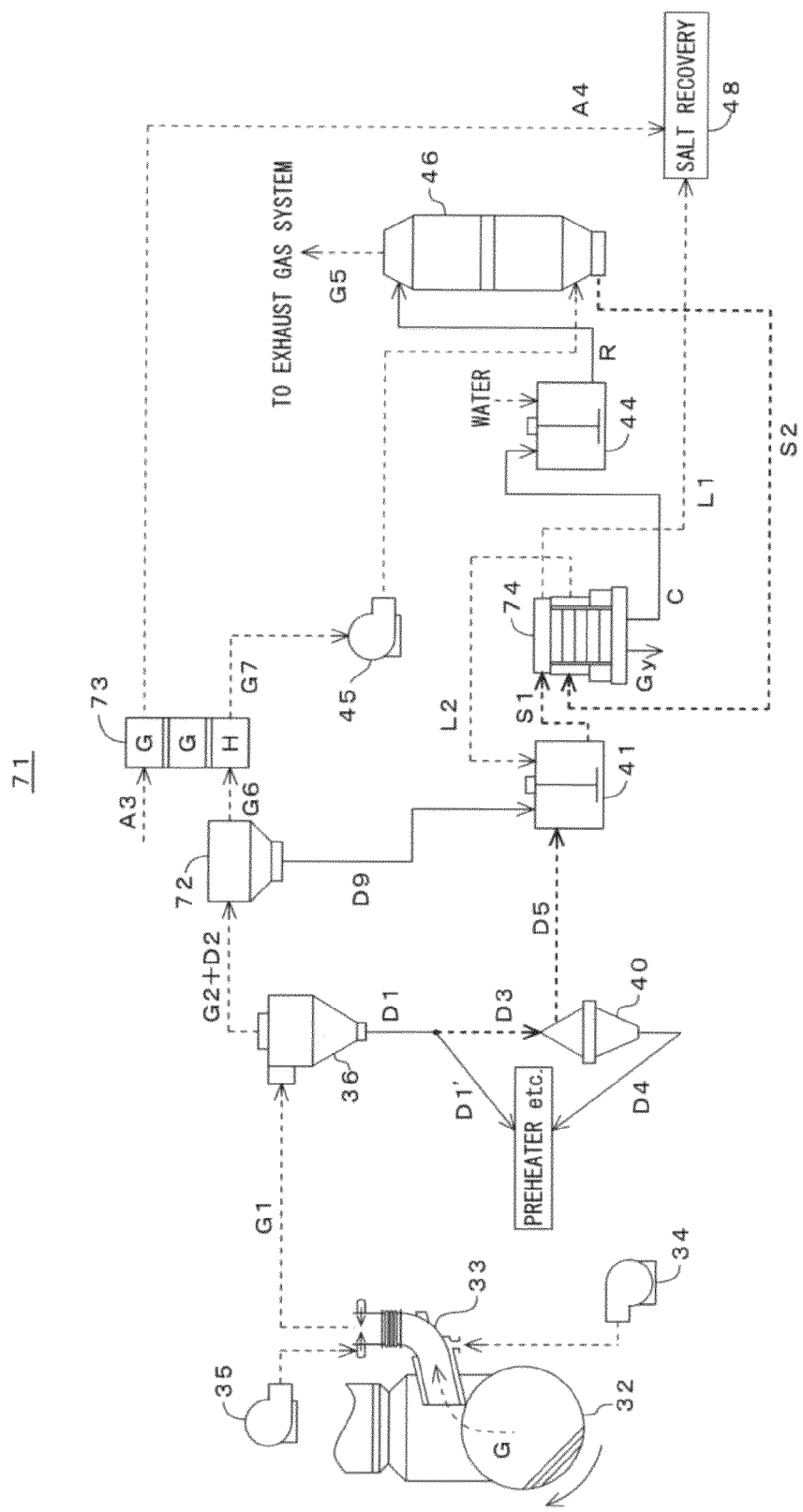
FIG. 8 is a flow chart showing a chlorine bypass dust and chlorine bypass exhaust gas treatment apparatus according to the fifth embodiment of the present invention.

Next, an apparatus for treating chlorine bypass dust and chlorine bypass exhaust gas according to the fifth embodiment of the present invention will be explained in detail with reference to FIG. 8. In FIG. 8, to the same components as the chlorine bypass facility 31 shown in FIG. 5 are attached the same symbols, and explanations thereof will be omitted.

This chlorine bypass facility 71 is characterized by having: a high-temperature dust collector 72 instead of the cooler 37, the bag filter 38 and the dust tank 39 of the chlorine bypass facility 31; a gas-gas heater 73 is installed in the rear stage of the high-temperature dust collector 72; and a single solid/liquid separator 74 is installed instead of the first and second solid/liquid separators 42, 47, and other components are the same as those of the chlorine bypass facility 31.

The high-temperature dust collector 72 is provided with, for example, a ceramic filter, and is a high-heat-resistant bag filter or an electric dust collector which has heat-resistant up to about 900° C. The high-temperature dust collector 72 collects dust in an extracted gas G2 including the fine powder D2 that is discharged from the cyclone 36 without cooling it, and feeds the collected dust (chlorine bypass dust) D9 to the first dissolution tank 41.

The gas-gas heater 73 is installed to heat an air A3 taken from the circumference with an extracted gas G6 discharged from the high-temperature dust collector 72, and to utilize a high-temperature air A4 heated by the gas-gas heater 73 in a salt recovery device 48 arranged in the rear stage for salt recovery. With this, the chlorine bypass exhaust gas can be treated while utilizing heat of the extracted combustion gas. In addition, by the heat exchange to the air A3, it becomes possible to adjust temperature of the exhaust gas G7 for desulfurization in the dissolution reaction tank 46, which suppresses generation of solidification. Further, the heat recovered by the gas-gas heater 73 may be utilized for raising temperature of the exhaust gas G5 from the dissolution reaction tank 46.

The solid/liquid separator 74 is installed to separately perform, while sharing time, solid/liquid separations of the slurry S1 discharged from the first dissolution tank 41 and the slurry S2 fed from the dissolution reaction tank 46. The cake C obtained by solid/liquid separation of the slurry S1 is fed to the second dissolution tank 44, and the filtrate L1 is fed to the salt recovery device 48. In addition, the filtrate L2 obtained by solid/liquid separating the slurry S2 is reused in the first dissolution tank 41, and dihydrate gypsum Gy is recovered in the cake obtained by the solid/liquid separation.

In the chlorine bypass facility 71 also, the chlorine bypass exhaust gas can be treated while effectively utilizing heat of the extracted combustion gas, and facility cost thereof can be decreased by decreasing the number of solid/liquid separators.

| EXPLANATION OF REFERENCE NUMBERS | |
|---|---|
| 1 | chlorine bypass facility |
| 2 | cement kiln |
| 3 | probe |
| 4 | cyclone |
| 5 | heat exchanger |
| 6 | bag filter |
| 7 | classifier |
| 8 | dust tank |
| 9 | dissolution reaction tank |
| 10 | adjustment tank |
| 11 | solid/liquid separator |
| 21 | chlorine bypass facility |
| 27 | classifier |
| 31 | chlorine bypass facility |
| 32 | cement kiln |

-continued

| EXPLANATION OF REFERENCE NUMBERS | |
|---|---|
| 33 | probe |
| 34, 35 | cooling fans |
| 36 | cyclone |
| 37 | cooler |
| 38 | bag filter |
| 39 | dust tank |
| 40 | classifier |
| 41 | first dissolution tank |
| 42 | first solid/liquid separator |
| 44 | second dissolution tank |
| 45 | fan |
| 46 | dissolution reaction tank |
| 47 | second solid/liquid separator |
| 48 | salt recovery device |
| 61 | chlorine bypass facility |
| 62 | gas-gas heater |
| 71 | chlorine bypass facility |
| 72 | high-temperature dust collector |
| 73 | gas-gas heater |
| 74 | solid/liquid separator |

The invention claimed is:

1. A method of treating chlorine bypass dust and chlorine bypass exhaust gas characterized by, in a chlorine bypass facility extracting a part of combustion gas, while cooling it, from a kiln exhaust gas passage, which runs from an inlet end of a cement kiln to a bottom cyclone, and recovering a chlorine bypass dust from the extracted gas, slurring the recovered chlorine bypass dust, and contacting the slurry with the exhaust gas from the chlorine bypass facility, wherein said recovered chlorine bypass dust is slurried after classified, and the slurry is contacted with the exhaust gas from the chlorine bypass facility.

2. The method of treating chlorine bypass dust and chlorine bypass exhaust gas as claimed in claim 1, wherein a classification point when the chlorine bypass dust is classified is controlled by an amount of $SO_2$ contained in the exhaust gas from the chlorine bypass facility for contacting to the slurry (a product of an amount of the exhaust gas from the chlorine bypass facility and $SO_2$ concentration in the exhaust gas).

3. The method of treating chlorine bypass dust and chlorine bypass exhaust gas as claimed in claim 2, wherein said classification point is determined such that 70 mass percent or more and 100 mass percent or less of the recovered chlorine bypass dust passes through 1 μm mesh.

4. The method of treating chlorine bypass dust and chlorine bypass exhaust gas as claimed in one of claims 1, 2 and 3, wherein a coarse powder that is classified before recovering the chlorine bypass dust from the extracted gas is further classified, and a fine powder obtained by the second classification is slurried together with the chlorine bypass dust, and the slurry is contacted with the exhaust gas from the chlorine bypass facility.

5. The method of treating chlorine bypass dust and chlorine bypass exhaust gas as claimed in one of claims 1, 2 and 3, wherein pH of said slurry being contacted with the exhaust gas from the chlorine bypass facility is adjusted to 3.0 or more and 10.5 or less.

6. The method of treating chlorine bypass dust and chlorine bypass exhaust gas as claimed in one of claims 1, 2 and 3, wherein pH of said slurry after contacted with the exhaust gas from the chlorine bypass facility is adjusted to 7.0 or more and 10.5 or less.

7. The method of treating chlorine bypass dust and chlorine bypass exhaust gas as claimed in one of claims 1, 2 and 3, wherein a solid content is obtained by solid/liquid separating the slurry after contacted with the exhaust gas from the chlorine bypass facility and is fed to a cement finishing process.

8. The method of treating chlorine bypass dust and chlorine bypass exhaust gas as claimed in claim 1 wherein the steps of slurring the recovered chlorine bypass dust and contacting the slurry with the exhaust gas from the chlorine bypass facility further comprise the steps of:
   slurring the recovered chlorine bypass dust;
   dewatering the slurry to form a cake;
   dissolving the cake into a slurry; and
   performing desulfurization of the exhaust gas from the chlorine bypass facility by contacting the slurry in which the cake dissolves with the exhaust gas.

9. The method of treating chlorine bypass dust and chlorine bypass exhaust gas as claimed in claim 8, wherein a coarse powder that is classified before recovering the chlorine bypass dust from the extracted gas is further classified; a fine powder obtained by the second classification is slurried together with the chlorine bypass dust; the slurry is dewatered to form a cake; the cake is dissolved into a slurry; and the slurry in which the cake is dissolved is contacted with the exhaust gas from the chlorine bypass facility for desulfurization.

10. The method of treating chlorine bypass dust and chlorine bypass exhaust gas as claimed in one of claims 1, 2-3 and 8-9, wherein potassium concentration and chlorine concentration of the slurry in which the chlorine bypass dust is dissolved or/and the slurry in which the cake obtained by slurring the chlorine bypass dust and dewatering it is dissolved, is adjusted to 6% or less.

11. The method of treating chlorine bypass dust and chlorine bypass exhaust gas as claimed in claim 10, wherein purity of gypsum that is obtained by solid/liquid separating the slurry in which the chlorine bypass dust is dissolved or/and the slurry that is generated by contacting the slurry in which the cake obtained by slurring the chlorine bypass dust and dewatering the slurry is dissolved, with the exhaust gas from the chlorine bypass facility is adjusted to 75% or more.

12. The method of treating chlorine bypass dust and chlorine bypass exhaust gas as claimed in one of claims 1, 2-3 and 8-9, wherein $SO_4^{2-}$ concentration of the slurry is adjusted to 10000 mg/L or less.

13. An apparatus for treating, chlorine bypass dust and chlorine bypass exhaust as that is attached to a chlorine bypass facility extracting a part of combustion gas, while cooling it, from a kiln exhaust gas passage, which runs from an inlet end of a cement kiln to a bottom cyclone, and recovering chlorine bypass dust from the extracted gas comprising:
   a first dissolution tank for slurring the recovered chlorine bypass dust;
   a solid/liquid separator for solid/liquid separating a slurry generated in the first dissolution tank;
   a second dissolution tank for dissolving a cake generated in the solid/liquid separator again;
   a dissolution reaction tank tar contacting the slurry after the cake is dissolved again, which is generated in the second dissolution tank, with the exhaust gas from the chlorine bypass facility to per on desulfurization of the exhaust gas.

14. The apparatus for treating chlorine bypass dust and chlorine bypass exhaust gas as claimed in claim 13 further comprising:
   a salt recovering device for recovering a salt from a filtrate discharged from the solid/liquid separator; and
   a gas-gas heater for utilizing a heat recovered from the exhaust gas for recovering the salt in the salt recovering device.

15. The apparatus for treating chlorine bypass dust and chlorine bypass exhaust gas as claimed in claim 14, wherein the gas-gas heater recovers heat from the exhaust gas from a high-temperature dust collector for collecting dust from the extracted gas.

\* \* \* \* \*